United States Patent [19]
Groeger

[11] Patent Number: 5,885,696
[45] Date of Patent: Mar. 23, 1999

[54] PATTERNED FIBROUS WEB

[75] Inventor: H. Gunter Groeger, Charlotte, N.C.

[73] Assignee: AQF Technologies LLC, Charlotte, N.C.

[21] Appl. No.: 97,464

[22] Filed: Jun. 15, 1998

[51] Int. Cl.⁶ .................................................. B32B 5/02
[52] U.S. Cl. ...................... 428/206; 428/208; 442/417; 156/145; 156/308.2; 156/311
[58] Field of Search ................. 156/145, 308.2, 156/311; 442/417; 428/206, 208

[56] References Cited

U.S. PATENT DOCUMENTS

| | | | |
|---|---|---|---|
| 3,971,373 | 7/1976 | Braun .................................... | 128/146.2 |
| 5,486,410 | 1/1996 | Groeger et al. ......................... | 428/283 |
| 5,589,256 | 12/1996 | Hansen et al. .......................... | 428/283 |
| 5,605,746 | 2/1997 | Groeger et al. ......................... | 442/347 |
| 5,662,728 | 9/1997 | Groeger ................................. | 96/153 |
| 5,674,339 | 10/1997 | Groeger et al. ......................... | 156/145 |
| 5,779,847 | 7/1998 | Groeger ................................ | 156/308.2 |

*Primary Examiner*—Marion McCamish
*Assistant Examiner*—Ula Ruddock
*Attorney, Agent, or Firm*—Timothy R. Kroboth

[57] ABSTRACT

A patterned fibrous web and a process for making the patterned fibrous web are disclosed. The patterned web includes a plurality of functional particle-loaded areas forming a pattern of functional particles. Beneficially, when cut, the patterned fibrous web does not release functional particles from the cut edges.

6 Claims, 2 Drawing Sheets

PATTERNED FIBROUS WEB

FIELD OF THE INVENTION

This invention relates to a fibrous structure containing functional particles.

BACKGROUND OF THE INVENTION

Functional particles may be incorporated into a fibrous structure for a variety of reasons. For example, filter media or fibrous filters may include sorptive particles for selectively removing certain components of a liquid or gas passing through the filter. Alternatively, functional particles may release an active or desirable agent into a fluid stream. Furthermore, functional particles may be chemically or catalytically or otherwise reactive with or attractive to a fluid stream constituent. In any event, the functional particles need to be accessible. Accessibility is benefitted when the particles are distributed in a three dimensionally spaced apart arrangement.

Especially useful functional particle-containing fibrous structures are exemplified by U.S. Pat. No. 3,971,373 to Braun, and U.S. Pat. Nos. 5,605,746 and 5,674,339, both to Groeger et al, and are characterized by immobilized functional particles three dimensionally distributed and entrapped in a fibrous matrix, and beneficially bonded to the fibrous matrix. Conveniently, these fibrous structures are made in the form of a continuous web. However, when the continuous web is cut into sections or pieces, the immobilizing fibrous structure in the area of the cutting is disturbed with a result so that functional particles in the area are exposed and could be released from the fibrous structure.

In many applications, release of functional particles from a containing fibrous structure is of no significant consequence. However, sorptive applications and other applications do exist for which it is beneficial or essential that functional particle release from a functional particle-bearing fibrous structure be minimized or even be eliminated.

Therefore despite advances in this art, there is needed a fibrous web loaded with functional particles, which when cut, does not release functional particles from the cut edges. Furthermore, it would be beneficial if the containing fibrous web did not allow release of the functional particles from locations which would not be disturbed by the cutting, even if functional particles are not immobilized.

SUMMARY OF THE INVENTION

In accordance with the present invention, there is provided a fibrous web comprising functional particles, which when cut, does not release functional particles from the areas of the cutting. Specifically, there is provided a patterned fibrous web including a plurality of functional particle-loaded areas forming a predetermined pattern of functional particles over the length and width of the web. Furthermore, in accordance with the invention, the web beneficially prevents release of functional particles from the containing structure even at locations which would be undisturbed by the cutting.

In accordance with the invention, the functional particles are beneficially three dimensionally spaced apart in the individual particle-loaded areas, and the functional particle-loaded areas are bordered by an area free of the functional particles. The bordering area is a densified area which includes bonded fibrous structure and which is impervious to lateral passage of the functional particles. Furthermore, the plurality of particle-loaded areas are beneficially sandwiched by densified fibrous webs impervious to the functional particles, but permeable for access to the functional particles. Densification of the bordering area may be limited to self-densification alone, although additional densification will be beneficial or necessary for certain applications.

In accordance with the inventive process, a fibrous matrix is advantageously dry formed on a first densified fibrous web impervious to the functional particles, yet permeable for access to the functional particles. Thereafter, the functional particles are distributed in a predetermined pattern to provide a plurality of areas of the fibrous matrix which contain the functional particles, and an area surrounding the plurality of particle-loaded areas free of the functional particles. Beneficially, the fibrous matrix is open and generally uniform in structure, and the functional particles in the particle-loaded areas are distributed in a three dimensionally spaced apart arrangement for accessibility to the functional particles.

Thereafter, a second densified fibrous web is applied onto the fibrous matrix. Like the first densified fibrous web, the second densified fibrous web is impervious to the functional particles, yet permeable for access to the functional particles, so that the particle-loaded areas of the fibrous matrix in particular are beneficially sandwiched between fibrous webs protective against release of the functional particles through the upper or lower surface of the patterned fibrous structure.

Thereafter, the area of the fibrous matrix surrounding the plurality of particle-loaded areas and hence free of the functional particles, is advantageously self-densified and bonded to laterally seal the functional particles within the plurality of particle-loaded areas. As a result, when the patterned fibrous structure is cut into sections or pieces, the cutting being arranged to be through the bonded surrounding area, movement of the functional particles into the cut edges and hence release from the cut edges is blocked.

Preferably, in accordance with the invention, additional densification of the surrounding area accompanies the bonding of the surrounding area. If desired, the degree of lateral sealing can be increased by mechanical or other densification of the surrounding area. As a result, release of functional particles from the cut edges is further impeded.

In accordance with the invention, the patterned fibrous structure is constructed to be cut into sections or pieces, the cutting being arranged to be through the densified and bonded, or otherwise sealed, surrounding area, to yield a plurality of composite fibrous structures including functional particles accessibly distributed in a three dimensional arrangement sandwiched between densified fibrous webs, and each having a sealed perimeter preventing release of the functional particles.

BRIEF DESCRIPTION OF THE DRAWING

Reference is now made to the accompanying drawing which is highly illustrative, and forms a part of the specification of the present invention.

DETAILED DESCRIPTION OF THE INVENTION

Figure 1:
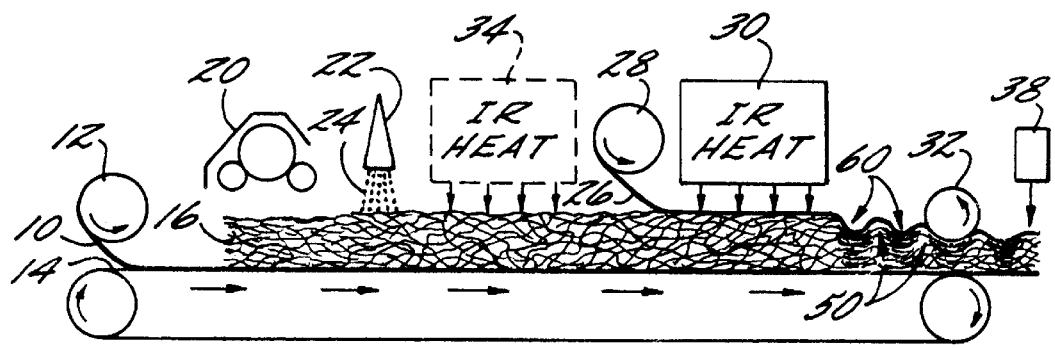
FIG. 1 illustrates a preferred process in accordance with the present invention.

In accordance with the present invention, as mentioned, densified fibrous webs are beneficially used as protective webs for sandwiching a core structure bearing functional particles and for being impervious to the functional particles. Also in accordance with the invention, these impervious webs are permeable for access to the functional particles.

Conveniently, a useful densified fibrous web may be prepared by processing steps including carding, heat bonding, densification by heat-softening and passing through a suitable nip gap, and thereafter cooling the densified web. Typically, for controlled densification, the cooling step will be carried out prior to the densified web being wound onto a roll. The amount of fiber to be used and the degree of densification depend upon factors including the type of fiber, the physical characteristics in particular size and shape, of the functional particles, and the fiber crimp. In any event, the interstices of a densified fibrous web useful in the present invention, are too small to allow the functional particles to pass through.

In accordance with the inventive process, a first densified fibrous web is prepared in-line or unwound from a roll onto an endless moving belt. Thereafter, a non-woven fibrous matrix for containing functional particles, is applied onto the densified fibrous web. The fibrous matrix is beneficially formed on the densified fibrous web by carding, although other dry forming processes may be used. Dry forming advantageously forms an open, generally uniform fibrous structure, and advantageously provides for controlled introduction, three dimensional spacing and entrapment of the functional particles, with accessibility to the functional particles and tortuous paths in the particle-loaded fibrous structure for flow. To enhance accessibility to the functional particles, the fibers should be so distributed to form a three dimensional, generally uniform fibrous matrix. As indicated earlier, the benefit of accessibility to the functional particles is an important consideration in selecting suitable processing techniques and conditions. A relatively more tortuous nature of flow advantageously effects relatively more efficient kinetics with the functional particles under dynamic conditions, and is also beneficial under static conditions where, for instance, attractive forces may produce interaction with functional particles. The volume occupied by the functional particles and fibers also influences accessibility and tortuosity.

Advantageously, the open fibrous matrix is formed from crimped staple fibers so as to be somewhat lofty for enhancing entrapment of the functional particles. Two- or three-dimensional, crimped fibers may be beneficially used. However, depending upon the intended use, useful fibers may be in a variety of forms including non-crimped, short-cut staple, and continuous filaments; also, a spun bond fibrous matrix may be used as the core structure.

Typically, the fibers will be present in the fibrous matrix in a range of about 5 to 95 wt. % compared to the loading of the functional particles. However, as will be explained in more detail, areas of the fibrous matrix will be free of the functional particles and hence comprise fibers only; and in these areas, in accordance with the process, the fibrous matrix is beneficially treated to serve an edge-sealing function for preventing lateral loss of the functional particles, and even movement of the functional particles into a sealed edge. In a variation, the fibrous matrix could be laid down in a pattern corresponding to those areas to be loaded with the functional particles, and edge-sealing provided by bonding upper and lower densified fibrous webs together.

The fibrous matrix and densified fibrous webs will be formed from composite fibers, non-composite fibers, or both. Beneficial composite fibers will include a structural fiber component for structural integrity, a lower melting fiber component for bonding, and may include a third component distinct from the structural fiber component and the lower melting fiber component. Similarly, beneficial non-composite fibers will include a structural fiber and a lower melting fiber. Polyesters such as polyethylene terephthalate are particularly useful as a structural fiber component or structural fiber. Advantageous lower melting polymers include lower melting polyamides, in particular homopolymers such nylon-6, nylon-11 and nylon-12, and polyolefins such as polyethylene, and modified polyesters. Typically, it will be advantageous to provide for both fiber—fiber bonding and particle-fiber bonding.

Other techniques such as powder bonding may be used to provide bonding, and could be limited to areas comprising fibers only. In any event, to enhance accessibility to the functional particles, any particle-fiber bonding advantageously does not significantly coat or otherwise reduce the performance of the functional particles.

The denier of useful fibers will vary depending upon the intended application, and whether the fibers are used to form the densified webs or the fibrous matrix. Typically, macrofibers having an average diameter of about 12 to 25 microns, will be used. If desired, fine denier fibers of less than 1 micron to 10 microns may be used with benefit in the densified fibrous webs, whereas stiffening fibers having a denier of from about 6 to 5,000 or more may be included in the fibrous matrix. Thus, if desired, fibers of significantly different diameters can be combined. The macrofibers, microdenier fibers or stiffening fibers may be composite or non-composite fibers or both. Fibrous structures of densified fibrous webs and including a core structure bearing spaced apart functional particles in accordance with the invention, can be built to thicknesses of from 0.5 to 50 mm or more.

In accordance with the present invention, the functional particles are distributed in a predetermined pattern to provide a plurality of areas of the fibrous matrix bearing the functional particles, and an area which is free of the functional particles and surrounds the plurality of particle-loaded areas. This processing step is beneficially carried out using a pattern applicator. For convenience, the term "areas" is used even though the functional particles are three dimensionally distributed to provide a suitable loading per unit volume (area×thickness), more specifically available web volume. Accessibility to the functional particles is benefitted by spacing of the functional particles within the three dimensional space of the fibrous matrix. The particle-loaded areas may have a variety of shapes depending upon the intended application, for example, square, round, dough nut or any irregular pattern, but in any event, will be surrounded or bordered by an area or areas free of the functional particles.

The functional particles may be selected from a wide variety of materials having a desirable function. Useful functional particles include adsorbent materials such as activated carbon, molecular sieves, silica, ion exchangers, and oxides and hydroxides such as aluminum oxide and hydroxide. Other useful inorganic particles include zeolites, activated alumina and clays, and other useful organic particles include polymeric particles such as polystyrenes. Functional particles may be catalytic agents including enzymatic agents, and may be biocidal, fungicidal or virucidal. It will be understood that the foregoing list is representative, not in limitation, of the substances suitable for use in the practice of the present invention.

The functional particles may range in size, and may vary in shape from regularly shaped spheroidal beads, cylinders and so forth, to irregularly shaped particles. However, the particles beneficially have suitable physical characteristics including an appropriate size and shape, relative to the interstitial spaces of the fibrous matrix, to be entrapped. For example, particles of about 400 to 500 microns are suitable for entrapment in a matrix of fibers of an average diameter of about 15 microns. Furthermore, the particles beneficially have a weight suitable for distribution and entrapment by gravity.

If desired, two or more types of functional particles could be mixed together and added together to the fibrous matrix. However, in certain cases, it will be advantageous for different types of functional particles to be added subsequent to one another, by using one pattern applicator for one type of particles and another pattern applicator for another type of particles, or to be arranged in layers within one pattern. Likewise, one type of functional particles may be added in single or multiple applications.

In any event, after the functional particles have been added to the fibrous matrix, a second densified fibrous web is applied onto the fibrous matrix to sandwich the fibrous matrix between protective fibrous webs. Conveniently, the second densified fibrous web is applied from a roll and is constituted the same as the first densified fibrous web. If desired, the densified webs may differ from one another in the degree of permeability to the functional particles, in constituent fibers, or otherwise. However, in any event, like the first densified web, the interstices of the second densified fibrous web are too small to allow passage of the functional particles.

Thereafter, in accordance with the present invention, the fibrous structure is bonded, and in particular is advantageously subjected to a suitable elevated temperature by infrared heating or other technique for providing heating without pressure, to effect fibrous matrix bonding, particle-fiber bonding, and beneficially self-densification. Beneficially, for self-densification, an elevated temperature is maintained sufficient for release of inner fiber tension and softening of the fibrous matrix particularly around the perimeter of the particle-loaded areas. A suitable period of time will be allowed to achieve the desired results and will depend upon the particular elevated temperature. In any event, bonding conditions and a treatment time appropriate for maintaining functional particle accessibility, are used. In other words, it would be undesirable to use bonding conditions that would cause the collapse of the functional particle-fibrous matrix or otherwise not maintain relative microstructural spacing relationships. Depending upon the intended application, particle-fiber bonding of some or all functional particles may not be necessary.

If desired, the heating of the fibrous structure may be from both its upper surface and lower surface. For instance, a resistance heater could be used for heating the fibrous structure by conduction from its lower surface, and an infrared heat source conveniently set at a relatively higher heat output than the resistance heater, could be located above the upper surface. An infrared oven is a convenient infrared heat source.

A fibrous matrix advantageously results which is, upon cooling, bonded especially edge-bonded in the surrounding area, and which is beneficially self-densified in the surrounding area sufficiently, upon cooling, to laterally seal the functional particles within the particle-loaded areas. Further, in the particle-loaded areas, a stabilized structure results with functional particles entrapped within and typically bonded to the bonded fibrous matrix. In addition, the bonding results in the densified webs being respectively bonded to the upper and lower surfaces of the fibrous matrix.

If desired, self-densification and bonding can be initiated prior to, rather than after, applying the second densified fibrous web onto the fibrous matrix. Again, bonding conditions including an elevated temperature, heat without pressure, and an appropriate treatment time would be beneficially used for fiber-fiber bonding, particle-fiber bonding, and self-densification as described for the bonding after applying the second densified web. When initiating self-densification and bonding prior to, rather than after, applying the second densified fibrous web, there will typically be no advantage in a cooling step between; rather, it will be advantageous to use the initial heat to bond the second densified fibrous web to the fibrous matrix, and in addition, advantageous to allow conduction of resident heat within the heated fibrous structure to promote a generally uniform elevated temperature throughout the heated fibrous structure prior to the subsequent heating step.

However, even if the same infrared heat treatment conditions were used, the degree of fibrous matrix self-densification of an area free of the functional particles would typically be less before applying the densified fibrous web than after applying the densified fibrous web. Therefore, initiating self-densification and bonding after applying the densified fibrous web not only assures that the applied densified web is bonded to the fibrous web, but also typically results in a greater degree of fibrous matrix self-densification and bonding because the fibrous matrix is under a relatively greater load after the densified web has been applied onto the fibrous matrix.

If desired, the degree of lateral sealing of the particle-loaded fibrous matrix areas can be increased. Although a variety of techniques may be used to increase densification and bonding, the fibrous structure surrounding or bordering the particle-loaded fibrous matrix areas, will be advantageously densified by passing the entire fibrous web beneath a roll. A nip roll or a patterned roll may be used for this purpose. Both nip rolls and patterned rolls are, of course, known. An appropriate nip gap for the nip roll will depend upon the thickness and functional particle loading of the fibrous matrix, and in particular should not be so small as to crush the particle-fibrous matrix structure and destroy accessibility to the functional particles, but yet small enough to place the surrounding fibrous matrix structure under a load effective to beneficially increase its densification and bonding. The nip roll load should be likewise selected. There will typically be no advantage in a cooling step between initiating bonding, and densification using a roll; rather, it will be advantageous to use the resulting heat within the fibrous structure to soften the fibrous matrix in preparation for densification of the surrounding area using a roll. As will be understood by one skilled in the art, techniques beneficial in the inventive process will result in increased bonding accompanied by increased densification.

Beneficially, a preferred patterned roll will have a surface shaped to compress and densify the fibrous structure in the surrounding area, and typically to lightly compress or not compress at all the particle-loaded areas. In other words, the surface of the patterned roll will typically include a raised pattern area that generally corresponds to the pattern of the surrounding fibrous structure. Although a raised pattern area may function like a calendar roll, it will typically be inadvisable to use a calendar roll for densification because of the likelihood of crushing functional particles, as well as of interference with accessibility to the functional particles resulting from undue compression or destruction of a particle-fibrous matrix comprising three dimensionally spaced particles.

When used, this densification of the surrounding fibrous matrix will be supplementary to the self-densification which typically results during the initial bonding step. As will be understood, the need for increasing the degree of lateral sealing depends upon the fiber density in the surrounding fibrous matrix and the intended application, and relatively greater fiber density usually results in a more impervious lateral seal. Further, the degree of densification of the surrounding area, as well as the fiber density of the pre-densified webs, will be driven by the particle size of the functional particles and the need, depending upon the intended application, to prevent loss of any functional particles at all from the core structure laterally or through the sandwiching pre-densified fibrous layers.

As an alternative or in addition to densification using a roll such as a nip roll or patterned roll, a conventional separate heat sealing technique such as ultrasonic welding, may be used. Thus, a variety of techniques may be used to increase the degree of lateral sealing of the particle-loaded areas, although convenient techniques typically will cause densification of the surrounding area.

Beneficially, after the desired degree of densification has been obtained, the fibrous structure is cooled to provide a stabilized bonded structure. If a greater degree of lateral sealing is desired, then typically the cooling will follow the additional processing technique or techniques, so that advantage is taken of the resident heat within the fibrous structure. Active or forced cooling, or ambient air (passive) cooling may be used, and conventional techniques may be used for active cooling.

As will be understood, the foregoing process will yield a web comprising a plurality of functional particle-loaded areas forming a predetermined pattern of functional particles over the length and width of the web. Furthermore, there is no limit to the number of particle-loaded areas which can be formed on a web; rather, the number of areas will depend upon the web length and width, and the pattern size. On the other hand, the web may have only a few patterns, say, ten or twelve or less. Moreover, the web will be particularly characterized by a bonded fibrous structure in which the functional particles are accessibly spaced apart in the individual functional particle-loaded areas, in which the functional particle-loaded areas are surrounded by an area free of the functional particles which laterally seals the functional particles within the particle-loaded areas, and in which densified webs permeable for access to the functional particles but impervious to the functional particles, sandwich the plurality of particle-loaded areas.

Thereafter, the web will be subjected to a cutting step carried out in accordance with the particular pattern of functional particles in the web, with the cutting being through the edge seal area. Conventional cutting equipment and techniques may be used, with the cutting being conveniently through a midline of the edge seal area between adjacent particle-loaded areas. As a result, there are produced a plurality of composite fibrous structures comprising functional particles accessibly arranged and sandwiched between densified fibrous webs impervious to the functional particles, and edge-sealed to be impervious to the lateral loss of the functional particles, or beneficially even movement of the functional particles into the sealed perimeter. As will be understood by one skilled in the art, the cutting step can be combined with a technique for increasing the degree of lateral sealing.

Referring to FIG. 1, a densified fibrous web 10 of crimped staple composite fiber and appropriate fiber density is conveniently laid from a roll 12 onto an endless moving belt 14, and thereafter an open, generally uniform fibrous matrix 16 likewise of crimped staple composite fiber and appropriate fiber density is beneficially dry formed on web 10 using a carding machine 20. If desired, the densified fibrous web may be made on belt 14 prior to forming the fibrous matrix 16. In any event, the interstices of the densified fibrous web are too small to allow passage of functional particles to be added to fibrous matrix 16, yet the densified fibrous web is permeable for access to the functional particles.

Figure 2:
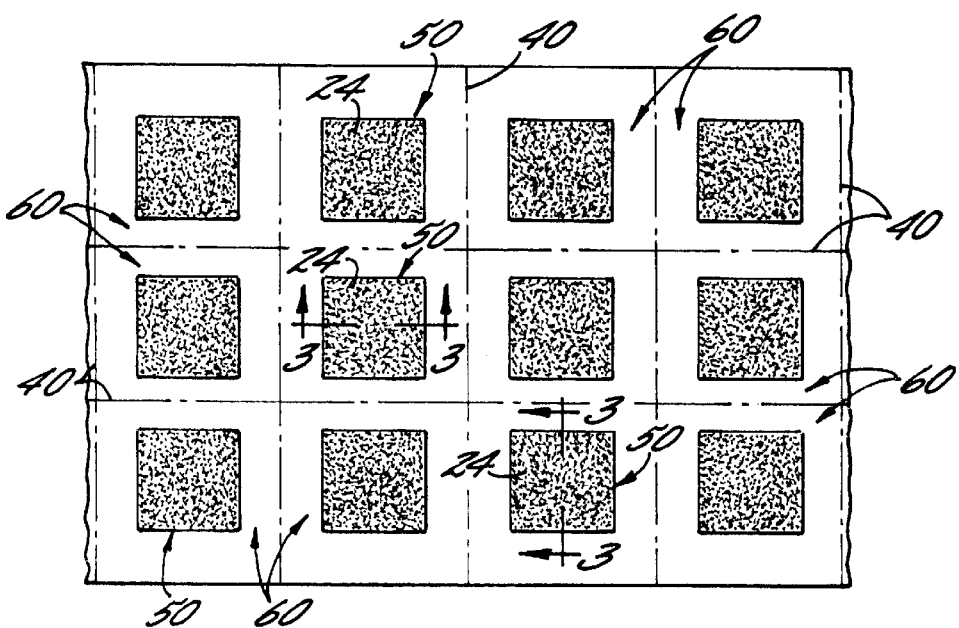
FIG. 2 is a top sectional view of a patterned fibrous web in accordance with the present invention.

Thereafter, referring also to FIG. 2, using a pattern applicator 22, functional particles 24 of appropriate size and shape relative to the interstices of fibrous matrix 16, are deposited into and entrapped within fibrous matrix 16 in a predetermined pattern to provide a plurality of areas 50 of fibrous matrix 16 which include three-dimensionally spaced apart functional particles, and an area 60 which is free of the functional particles and surrounds particle-loaded areas 50. Particle-loaded areas 50 may have a variety of shapes depending upon the intended application, but in any event, will be surrounded or bordered by an area 60 or areas free of functional particles.

Thereafter, again referring to FIG. 1, a second densified fibrous web 26 is applied onto fibrous matrix 16 to sandwich fibrous matrix 16 between densified fibrous webs 10,26. Conveniently, the second densified fibrous web is applied from a roll 28 and is constituted the same as densified fibrous web 10; however, the densified webs may differ from one another. In any event, like densified web 10, the interstices of densified fibrous web 26 are too small to allow functional particles 24 to pass through, yet densified web 26 is permeable for access to the functional particles.

Thereafter, with continued reference to FIG. 1, the fibrous structure is bonded, and in particular is advantageously heated using an infrared heat source 30 and a suitable elevated temperature to effect fibrous matrix bonding at fiber crossover points through melting of the lower melting fiber component, and as indicated in FIG. 1, beneficially self-densification particularly in surrounding area 60 free of the functional particles. Beneficially, bonding conditions and a treatment time appropriate for maintaining functional particle accessibility, are used. A fibrous matrix results which is, upon cooling, bonded especially edge-bonded in area 60, and which is beneficially self-densified sufficiently in surrounding area 60 to, upon cooling, laterally seal the functional particles within particle-loaded areas 50. Further, in areas 50 also indicated in FIG. 1, a stabilized structure results with the functional particles entrapped within and bonded to bonded fibrous matrix 16. In addition, the bonding results in densified webs 10,26 being respectively bonded to the upper and lower surfaces of fibrous matrix 16. As indicated by an infrared heat source 34 in FIG. 1, if desired, self-densification and bonding can be initiated prior to applying densified web 26 onto fibrous matrix 16, and a second heating step using heat source 30 carried out after the application of web 26.

Thereafter, if desired, the degree of lateral sealing of particle-loaded areas 50 may be increased by passing the web beneath a nip roll 32. The degree of densification, as well as the fiber density of pre-densified webs 10,26, will be driven by the particle size of the functional particles and the need, depending upon the intended application, to prevent loss of any functional particles at all laterally, or through the sandwiching pre-densified layers.

Figure 3:
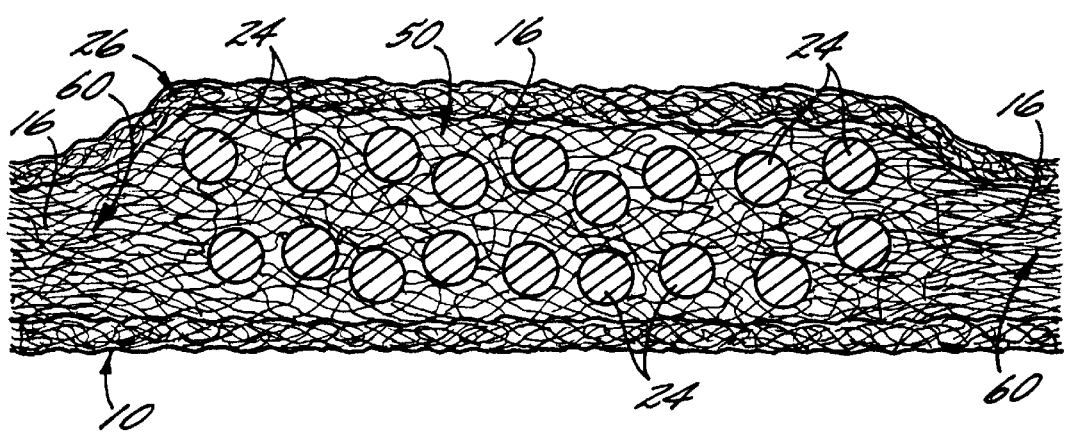
FIG. 3 is an enlarged, partial cross-sectional view taken substantially along lines 3—3 of FIG. 2, with the size of the functional particles exaggerated.

Beneficially after the desired densification has been obtained, the fibrous structure may be actively cooled using a conventional cooling source 38, to provide a stabilized bonded structure. With particular reference to FIGS. 2 and 3, the result is a continuous composite web comprising a plurality of particle-loaded areas 50 forming a predetermined pattern over the length of the continuous web, and particularly characterized by a bonded fibrous structure in which the plurality of areas 50 include functional particles 24 accessibly spaced apart and surrounded by an area 60 free of the functional particles which laterally seals the functional particles within the plurality of areas 50, and in which densified webs 10,26 permeable for access to the functional particles but impervious to the functional particles, sandwich spaced apart functional particles 24.

Figure 4:
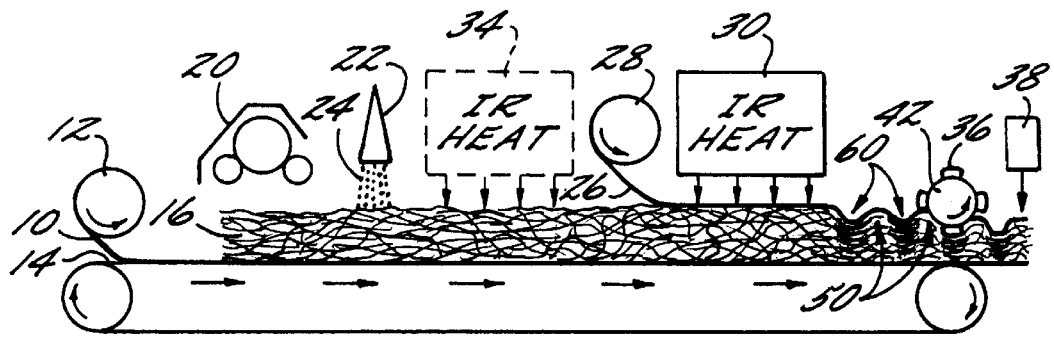
FIG. 4 illustrates a modification of the preferred process shown in FIG. 1.

Referring to FIG. 4, an alternative to nip roll 32 for densification is a patterned roll 42. Patterned roll 42 has an exterior surface 36 shaped to compress and densify the fibrous matrix in surrounding area 60, and typically to lightly compress or not compress at all particle-loaded areas 50. As will be understood, it is possible to achieve a greater degree of densification around the perimeter of areas 50 using a patterned roll than a nip roll. If desired, matrix fiber in surrounding area 60 could be densified to a densification equal to that of pre-densified webs 10,26 or more.

Thereafter, the continuous web is subjected to a cutting step which is carried out in accordance with the particular pattern. For this step in the case of the FIG. 2 structure, the continuous web is passed through conventional cutting means which are conveniently in line with midlines (indicated in FIG. 2 by phantom lines 40) of surrounding area 60. As a result, there are produced a plurality of composite fibrous structures comprising functional particles accessibly spaced apart and sandwiched between densified fibrous webs permeable for access to the functional particles, but impervious to the functional particles, and edge sealed to be impervious to the lateral loss of the functional particles.

The present invention may be carried out with various modifications without departing from the spirit or essential attributes thereof, and accordingly, reference should be made to the appended claims, rather than to the foregoing specification as indicating the scope of the invention.

I claim:

1. A process for making a web comprising a plurality of areas loaded with functional particles and forming a predetermined pattern over the length of the web, said process comprising dry forming a fibrous matrix on a first densified fibrous web impervious to said functional particles, yet permeable for access to said functional particles;

thereafter distributing said functional particles in a predetermined pattern to provide a plurality of areas of said fibrous matrix comprising said functional particles in a three dimensional spaced apart arrangement, and an area surrounding said plurality of particle-loaded areas free of said functional particles;

thereafter applying a second densified fibrous web impervious to said functional particles, yet permeable for access to said functional particles, on said fibrous matrix so that said plurality of particle-loaded areas is sandwiched between said first densified fibrous web and said second densified fibrous web, and thereafter effecting self-densification and bonding of said surrounding area free of said functional particles to laterally seal said functional particles within said plurality of particle-loaded areas, wherein said process further comprises bonding said first densified fibrous web and said second densified fibrous web to said fibrous matrix, to produce a patterned fibrous web.

2. The process of claim 1, further comprising bonding said functional particles in said plurality of particle-loaded areas, to said fibrous matrix.

3. The process of claim 1, further comprising effecting further densification and bonding of said surrounding area of said patterned fibrous web.

4. The process of claim 1, further comprising cutting said patterned fibrous web along a plurality of lines defined to be within said surrounding area.

5. A patterned fibrous web comprising a plurality of functional particle-loaded areas forming a predetermined pattern over the length of said web, wherein said functional particles are three dimensionally spaced apart in the individual particle-loaded areas, wherein said functional particle-loaded areas are bordered by an area free of said functional particles, wherein said bordering area is a densified area comprising fibrous structure bonded at fiber crossover points, and wherein densified webs impervious to said functional particles but permeable for access to said functional particles, sandwich said plurality of particle-loaded areas.

6. The patterned fibrous web of claim 5, wherein said densified area is the result of self-densification only.

* * * * *